United States Patent
Kimura et al.

(10) Patent No.: US 8,190,214 B2
(45) Date of Patent: May 29, 2012

(54) IN-VEHICLE HANDSFREE APPARATUS

(75) Inventors: Yousuke Kimura, Nagoya (JP); Hideaki Suzuki, Nagoya (JP); Tooru Kakehi, Toyoake (JP); Takehiro Abeta, Anjo (JP); Takafumi Okayasu, Okazaki (JP)

(73) Assignee: Denso Corporation, Kariya (JP)

( * ) Notice: Subject to any disclaimer, the term of this patent is extended or adjusted under 35 U.S.C. 154(b) by 491 days.

(21) Appl. No.: 12/378,709

(22) Filed: Feb. 18, 2009

(65) Prior Publication Data

US 2009/0209296 A1 Aug. 20, 2009

(30) Foreign Application Priority Data

Feb. 19, 2008 (JP) ................. 2008-037503
Mar. 10, 2008 (JP) ................. 2008-059573
Oct. 9, 2008 (JP) ................. 2008-262785

(51) Int. Cl.
*H04M 1/247* (2006.01)

(52) U.S. Cl. .... 455/567; 455/88; 455/556.1; 455/569.1; 455/569.2; 455/575.9

(58) Field of Classification Search ............ 455/88, 455/556.1, 567, 569.1, 569.2, 575.9
See application file for complete search history.

(56) References Cited

U.S. PATENT DOCUMENTS

| 5,408,528 | A * | 4/1995 | Carlson et al. ........... 379/211.02 |
|---|---|---|---|
| 6,067,355 | A | 5/2000 | Lim et al. |
| 6,718,187 | B1 | 4/2004 | Takagi et al. |
| 6,993,367 | B2 | 1/2006 | Yamato et al. |
| 7,020,499 | B2 | 3/2006 | Moffi et al. |
| 7,274,288 | B2 | 9/2007 | Nagata |
| 7,308,289 | B2 | 12/2007 | Sychta |
| 7,327,226 | B2 | 2/2008 | Turnbull et al. |
| 7,349,722 | B2 | 3/2008 | Witkowski et al. |
| 7,376,434 | B2 | 5/2008 | Thomas et al. |
| 7,689,255 | B2 | 3/2010 | Kurauchi et al. |
| 7,873,392 | B2 | 1/2011 | Matsuda |
| 2004/0087335 | A1* | 5/2004 | Peiker ................ 455/556.2 |
| 2004/0151285 | A1* | 8/2004 | Sychta ................ 379/88.16 |
| 2005/0096099 | A1 | 5/2005 | Barclay et al. |

(Continued)

FOREIGN PATENT DOCUMENTS

JP 07-048761 5/1995

(Continued)

OTHER PUBLICATIONS

Notice of Allowance dated Jun. 9, 2011 from the USPTO in the related U.S. Appl. No. 12/378,706.

(Continued)

*Primary Examiner* — Kwasi Karikari
*Assistant Examiner* — William F Rideout
(74) *Attorney, Agent, or Firm* — Harness, Dickey & Pierce, PLC

(57) ABSTRACT

An in-vehicle handsfree apparatus establishes a handsfree profile connection with at least two cellular phones. It may be determined that a first cellular phone and a second cellular phone are receiving incoming calls at the same time, or that while a first cellular phone is calling, a second cellular phone is receiving an incoming call. In such a case, based on attributes (for example, a holder or intended use) of the first and second cellular phones, a notice manner of information on incoming call or information on telephone call is differentiated, for instance, in regard to a background color of a display window.

23 Claims, 11 Drawing Sheets

U.S. PATENT DOCUMENTS

| | | |
|---|---|---|
| 2005/0143054 A1 | 6/2005 | Fogel |
| 2005/0202852 A1 | 9/2005 | Wada |
| 2006/0040714 A1 | 2/2006 | Suzuki |
| 2006/0172780 A1 | 8/2006 | Krippgans |
| 2007/0026904 A1 | 2/2007 | Matsuda |
| 2007/0037607 A1 | 2/2007 | Matsuda |
| 2007/0054704 A1* | 3/2007 | Satoh .................. 455/569.1 |
| 2007/0066300 A1 | 3/2007 | Nishimura et al. |
| 2007/0127654 A1 | 6/2007 | Lin et al. |
| 2008/0039153 A1 | 2/2008 | Katoh et al. |
| 2008/0064419 A1* | 3/2008 | Ukon .................... 455/463 |
| 2009/0209295 A1 | 8/2009 | Suzuki |
| 2009/0209297 A1 | 8/2009 | Suzuki |
| 2009/0209298 A1 | 8/2009 | Abeta et al. |

FOREIGN PATENT DOCUMENTS

| | | |
|---|---|---|
| JP | 09-046397 | 2/1997 |
| JP | 11-32105 | 2/1999 |
| JP | 11-68999 | 3/1999 |
| JP | 11-331328 | 11/1999 |
| JP | 2001-165668 | 6/2001 |
| JP | 2002-223288 | 8/2002 |
| JP | 2002-237869 | 8/2002 |
| JP | 2002-354109 | 12/2002 |
| JP | 2003-218996 | 7/2003 |
| JP | 2004-104298 | 4/2004 |
| JP | 2004-201249 | 7/2004 |
| JP | 2005-244875 | 9/2005 |
| JP | 2005-260822 | 9/2005 |
| JP | 2005-286553 | 10/2005 |
| JP | 2006-019908 | 1/2006 |
| JP | 2006-094477 | 4/2006 |
| JP | 2006-211365 | 8/2006 |
| JP | 2006-277827 | 10/2006 |
| JP | 2007-013541 | 1/2007 |
| JP | 2007-036678 | 2/2007 |
| JP | 2007-104343 | 4/2007 |
| JP | 2007-180947 | 7/2007 |
| JP | 2007-251455 | 9/2007 |
| JP | 2008-042717 | 2/2008 |

OTHER PUBLICATIONS

Office Action dated Dec. 22, 2009 in Japanese Application No. 2008-037503.

Notice of Reason for Refusal dated Jan. 5, 2010 in Japanese Application No. 2008-262785.

Final Office Action dated Jan. 11, 2011, in corresponding Japanese Application No. 2008-262785.

Office Action dated Mar. 17, 2011 from corresponding U.S. Appl. No. 12/378,707.

Office Action dated Jun. 8, 2011 in corresponding U.S. Appl. No. 12/378,708.

Office Action dated Sep. 20, 2011 from the USPTO in the related U.S. Appl. No. 12/378,707.

Office Action dated Apr. 27, 2010 in Japanese Application No. 2008-133013.

Notice of Allowance dated Nov. 30, 2011 in corresponding US Application No. 2009/0209298.

Notice of Allowance dated Nov. 30, 2011 in corresponding U.S. Appl. No. 13/378,708.

Official communication dated Jan. 27, 2012 in corresponding U.S. Appl. No. 13/378,707.

Chinese Office Action dated Sep. 15, 2011 from SIPO in corresponding Chinese Patent Application No. 2009 1000 6452.X.

* cited by examiner

FIG. 2

PHONE INFO REGISTRATION DATA

| PHONE INFO | USER | INTENDED USE |
|---|---|---|
| A | HIGASHIDA | BUSINESS |
| B | HIGASHIDA | PERSONAL |
| C | NISHIMURA | BUSINESS |
| D | NISHIMURA | PERSONAL |
| E | MINAMINO | PERSONAL |
| F | KITAYAMA | PERSONAL |
| ⋮ | ⋮ | ⋮ |

WITHOUT PRIORITY

WITH PRIORITY

IN-VEHICLE HANDSFREE APPARATUS

CROSS REFERENCE TO RELATED APPLICATION

This application is based on and incorporates herein by reference Japanese Patent Applications No. 2008-59573 filed on Mar. 10, 2008 and No. 2008-262785 filed on Oct. 9, 2008.

FIELD OF THE INVENTION

The present invention relates to an in-vehicle handsfree apparatus having a handsfree connection section to establish a handsfree communication protocol connection with two or more cellular phones, and a control section to determine whether any one of the cellular phones is in a calling state or in an incoming call receiving state.

BACKGROUND OF THE INVENTION

Patent document 1: JP-2005-260822 A corresponding to US2005/0202852 A1

Patent document 1 discloses an in-vehicle handsfree apparatus operating as follows. The apparatus establishes a handsfree profile connection with a cellular phone brought in a passenger compartment of a relevant vehicle. When the brought-in cellular phone comes to be in an incoming call receiving state, the relevant incoming call information is displayed in a display device or a ring tone is sounded via a speaker. Thus, a user is notified that the cellular phone is receiving an incoming call.

In recent years, some users carry about several cellular phones for personal and business uses. Thus, the inventor assumes that an in-vehicle handsfree apparatus might be required to anticipate a case that multiple cellular phones are brought into a passenger compartment of the relevant vehicle. In other words, the inventor assumes that an in-vehicle handsfree apparatus might be required which has a function to establish a handsfree profile connection with each of the multiple cellular phones at the same time (referred to as a function for multi-profile connection) to thereby allow all the cellular phones to be in a handsfree standby state.

Further, even if an in-vehicle handsfree apparatus might be provided with such a function for multi-profile connection with multiple cellular phones as the inventor assumes, a situation might be assumed that while one of the cellular phones is in a calling state, another cellular phone may receive an incoming call. Further, another situation might be assumed that two or more of the cellular phones may be receiving individual incoming calls at the same time. In those situations, the inventor yet further assumes that a user may require to recognize a state of each cellular phone appropriately.

SUMMARY OF THE INVENTION

It is an object of the present invention to provide an in-vehicle handsfree apparatus to appropriately notify a user of states of multiple cellular phones with which a handsfree communication protocol connection is established at the same time, thereby improving the user's usability.

According to an example of the present invention, an in-vehicle handsfree apparatus is provided as follows. A handsfree connection section is configured to establish a handsfree communication protocol connection with a plurality of cellular phones simultaneously. A storage section is configured to store attributes of the cellular phones with which the handsfree communication protocol connection is established simultaneously. A control section is configured to determine whether an incoming call is being received by a cellular phone included in the cellular phones with which the handsfree communication protocol connection is established simultaneously. Herein, the control section is further configured to, when it is determined that, of the cellular phones with which the handsfree communication protocol connection is established simultaneously, at least two cellular phones are receiving individual incoming calls, cause a notice section to give notice of incoming call information relative to the at least two cellular phones in individual notice manners, the individual notice manners being differentiated from each other based on individual attributes stored in the storage section with respect to the at least two cellular phones.

Individual states of the cellular phones can be thus recognized, thereby enhancing the user's usability.

According to another example of the present invention, an in-vehicle handsfree apparatus is provided as follows. A handsfree connection section is configured to establish a handsfree communication protocol connection with a plurality of cellular phones simultaneously. A storage section is configured to store attributes of the cellular phones with which the handsfree communication protocol connection is established simultaneously. A control section is configured to determine whether a cellular phone included in the cellular phones with which the handsfree communication protocol connection is established simultaneously is in a calling state or in an incoming call receiving state. Herein, the control section is further configured to, when it is determined that, of the cellular phones with which the handsfree communication protocol connection is established simultaneously, one cellular phone is in an incoming call receiving state and an other cellular phone is in a calling state, cause a notice section to give notice of (i) calling information relative to the one cellular phone and (ii) incoming call information relative to the other cellular phone, in respective notice manners relative to the one cellular phone and the other cellular phone, the respective notice manners being differentiated from each other based on an attribute of the one cellular phone and an attribute of the other cellular phone, the attributes being stored in the storage section with respect to the one cellular phone and the other cellular phone.

Individual states of the cellular phones can be thus recognized, thereby enhancing the user's usability.

According to yet another example of the present invention, a method is provided for an in-vehicle handsfree apparatus to give notice of states of a plurality of cellular phones with which a handsfree communication protocol connection is established simultaneously. The method comprises: (i) storing attributes of the cellular phones with which the handsfree communication protocol connection is established simultaneously; (ii) determining that, of the cellular phones with which the handsfree communication protocol connection is established simultaneously, at least two cellular phones are receiving individual incoming calls; and (iii) causing a notice section to give notice of incoming call information relative to the at least two cellular phones in individual notice manners, the individual notice manners being differentiated from each other based on individual attributes stored in the storage section with respect to the at least two cellular phones.

According to still yet another example of the present invention, a method is for an in-vehicle handsfree apparatus to give notice of states of a plurality of cellular phones with which a handsfree communication protocol connection is established simultaneously. The method comprises: (i) storing attributes of the cellular phones with which the handsfree communication protocol connection is established simultaneously; (ii)

determining that, of the cellular phones with which the handsfree communication protocol connection is established simultaneously, one cellular phone is in an incoming call receiving state and an other cellular phone is in a calling state; and (iii) causing a notice section to give notice of (a) calling information relative to the one cellular phone and (b) incoming call information relative to the other cellular phone, in respective notice manners relative to the one cellular phone and the other cellular phone, the respective notice manners being differentiated from each other based on an attribute of the one cellular phone and an attribute of the other cellular phone, the attributes being stored in the storage section with respect to the one cellular phone and the other cellular phone.

BRIEF DESCRIPTION OF THE DRAWINGS

The above and other objects, features, and advantages of the present invention will become more apparent from the following detailed description made with reference to the accompanying drawings. In the drawings:

FIG. 2 is an example of phone registration data;

DETAILED DESCRIPTION OF THE PREFERRED EMBODIMENTS

Figure 1:
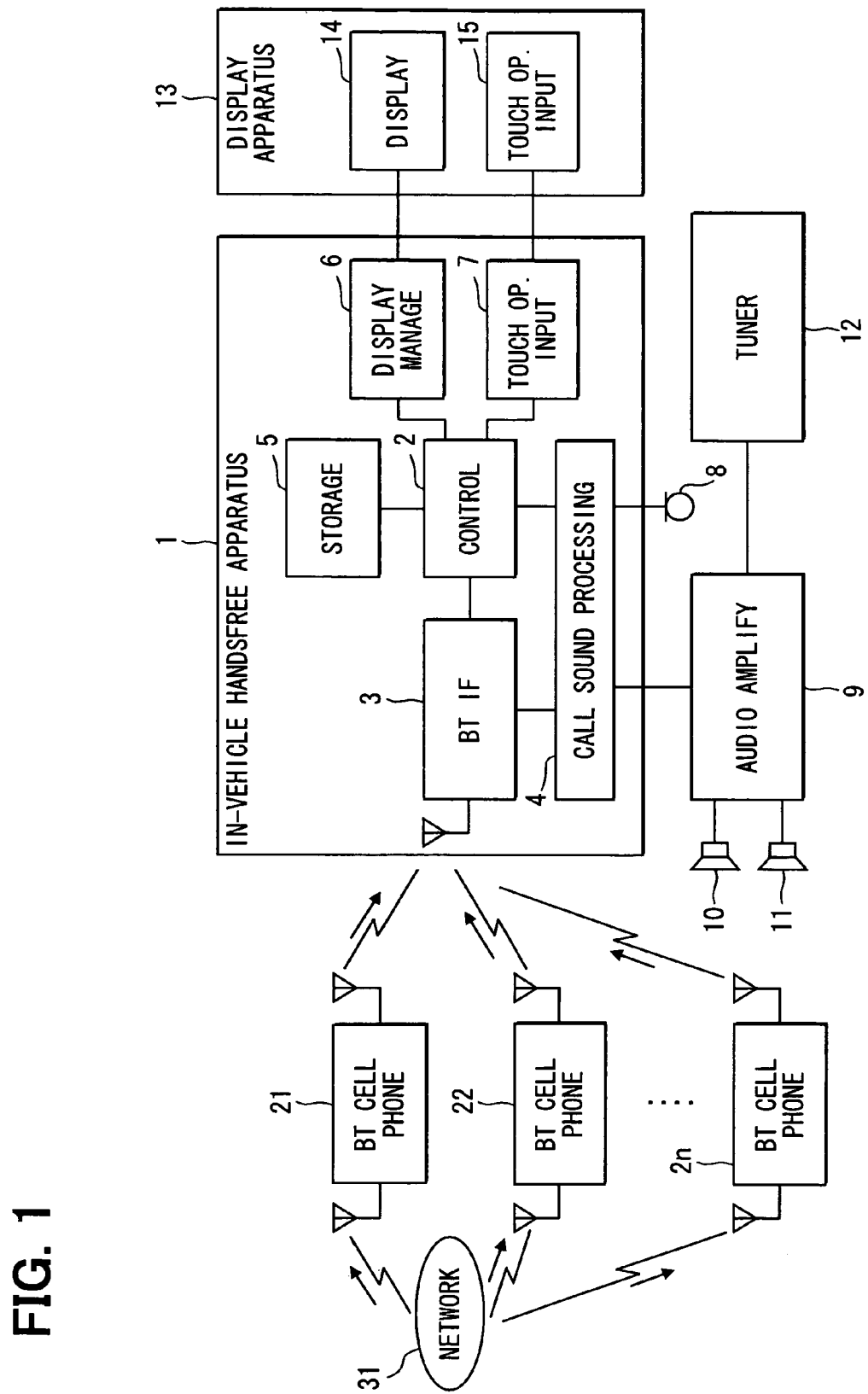
FIG. 1 is a functional block diagram of an in-vehicle handsfree apparatus according to an embodiment of the present invention.

An embodiment according to the present invention will be explained with reference to drawings. The following explains an example, in which each of two or more cellular phones has a Bluetooth (registered trademark, referred to as BT) communication function and the cellular phones are brought in a passenger compartment of a vehicle. An in-vehicle handsfree apparatus 1 according to an embodiment of the present invention is mounted in a vehicle and includes a control section 2, a BT interface section 3, a call sound processing section 4, a storage section 5, a display management section 6, and a touch operation input section 7. The control section 2 may function as an example of a clock means or portion, a connection clock time detection means or portion, and a connection times count portion. The BT interface section 3 may function as an example of a handsfree connection means or section.

The control section 2 includes a CPU, RAM, ROM, I/O bus, etc., and controls an overall operation of the in-vehicle handsfree apparatus 1 such as a communication operation, a data control operation, etc. In addition, the control section 2 has a calendar function which count times and dates. The BT interface section 3 supports (i.e., is compliant with) several profiles standardized by the communication standard of the BT such as a handsfree profile (HFP) for a handsfree telephone call and a phonebook access profile (PBAP) for transmission of telephone book data, historical outgoing call data, or historical incoming call data. The BT interface section 3 is further capable of multi-profile connection, which allows a handsfree profile to be simultaneously connected with each of two or more cellular phones compliant with the BT (referred to as a BT-compliant cellular phone). In other words, the BT interface section 3 can establish a handsfree profile connection with each of multiple BT-compliant cellular phones at the same time.

That is, BT-compliant cellular phones 21 to 2n (n: positive integer) are brought in a passenger compartment of the vehicle. The BT interface section 3 establishes a handsfree profile connection simultaneously with cellular phones 21 to 2n, which exist within a BT communication area covered by the BT interface section 3. Herein, the above profiles signify communication protocols defined for every function.

The call sound processing section 4 is connected with a microphone 8 and an audio amplifier 9. The microphone 8 is arranged at a position to easily collect user's utterance, for instance, at a vicinity of the steering wheel in the passenger compartment. The audio amplifier 9 is arranged outside of or separate from the in-vehicle handsfree apparatus 1. Under the handsfree telephone call using any one of the cellular phones 21 to 2n, when receiving a call sound which the user utters as a transmit sound via the microphone 8, the call sound processing section 4 operates a audio processing of the received transmit sound and outputs it to the BT interface section 3. When receiving a reception sound via the BT interface section 3, the call sound processing section 4 outputs the received reception sound to the audio amplifier 9. When the audio amplifier 9 receives the reception sound from the call sound processing section 4, the audio amplifier 9 amplifies the received reception sound and outputs the amplified sound via the speakers 10, 11.

The speaker 10 and the speaker 11 are arranged symmetrically with respect to the full length direction of the vehicle mounted with the present in-vehicle handsfree apparatus 1. For example, the speaker 10 is arranged at the driver side door, while the speaker 11 is arranged at the front passenger side door. In addition, the audio amplifier 9 is also connected to a tuner deck 12. For instance, the tuner deck 12 receives a musical tune sound from a storage medium for music, or a radio program from a radio station and outputs them to the audio amplifier 9. The audio amplifier 9 amplifies the received musical tune sound and the radio program, and outputs the amplified sounds via the speakers 10, 11.

The storage section 5 can store various data such as: phonebook data indicating correspondence between phone numbers and registration names; historical outgoing call data indicating correspondence between outgoing call clock times and destination phone numbers with respect to outgoing call from the in-vehicle handsfree apparatus 1 or cellular phones 21 to 2n with which a handsfree profile connection is established; and historical incoming call data indicating correspondence between incoming call clock times and source phone numbers with respect to incoming call to cellular phones 21 to 2n with which a handsfree profile connection is established. The storage section 5 further stores phone information registration data indicating, with respect to each of the cellular phones 21 to 2n, association of (i) phone information (e.g., telephone number), (ii) a holder or an owner, and (iii) intended use, as shown in FIG. 2.

When a user registers previously each of the cellular phones 21 to 2n for permitting a handsfree connection with the in-vehicle handsfree apparatus 1, the above association of the phone information, the holder, and the intended use is registered. Based on the operation of such a registration, the control section 2 causes the storage section 5 to store or record the phone information, holder, and intended use in association with each other. The holder or the intended use are equivalent to an attribute of each of the cellular phones 21 to 2n.

The display apparatus 13 includes a display device 14 having a display screen for displaying a display window and a touch operation input device 15 formed on the screen of the display device 14. The display device 14 may function as an example of a notice section or means. The display management section 6 controls a display operation of the display device 14 based on a display command signal, which is received from the control section 2. The touch operation input section 7 receives an operation detection signal via the touch operation input device 15 according to the user having operated the touch switch formed on the display screen and then outputs the received operation detection signal to the control section 2. The control section 2 analyzes and processes the received operation detection signal.

Each of the above-mentioned cellular phones 21 to 2n operates in the state (referred to as a standalone state) where a handsfree profile connection is not established with the in-vehicle handsfree apparatus 1, as follows. When receiving an incoming call (i.e., an incoming call signal) via the cellular phone network 31 as a communication network, an incoming call message is displayed in a display device (not shown) which indicates the relevant cellular phone has received an incoming call or a ring tone, which is registered previously, is outputted via a speaker (not shown). An incoming call notice operation for informing a user of the reception of the incoming call is thus performed.

If the relevant cellular phone 21 to 21n receives a call source telephone number (also referred to as a caller telephone number) via the cellular phone network 31, the caller telephone number is displayed in a display device or a registration name corresponding to the received caller telephone number is displayed in the display device. Herein, the registration name is stored in a phonebook data in association with the telephone number. Further, a ring tone registered in association with the caller telephone number is outputted via a speaker. Thus, the user can be also notified of information about the caller or call source party. Further, when an incoming call answer key for responding to an incoming call is operated by the user having recognized the incoming call, the relevant cellular phone 21 to 2n transmits an incoming call answer signal to the cellular phone network 31. Further, when an incoming call rejection key for rejecting the incoming call is operated by the user having recognized the incoming call, the relevant cellular phone 21 to 2n transmits an incoming call rejection signal to the cellular phone network 31.

In contrast, each of the cellular phones 21 to 2n operates in the state where a handsfree profile connection is established with the in-vehicle handsfree apparatus 1, as follows. When an incoming call is received via the cellular phone network 31, an incoming call notice signal is transmitted to the in-vehicle handsfree apparatus 1, without executing the above incoming call notice operation in the standalone state by the relevant cellular phone itself. In this case, the relevant cellular phone 21 to 2n transmits identification information (for example, telephone number, which is registered inside), which identifies the relevant cellular phone 21 to 2n, to the in-vehicle handsfree apparatus 1. If the caller telephone number is received via the cellular phone network 31, the received caller telephone number is also transmitted to the in-vehicle handsfree apparatus 1. Further, if the relevant cellular phone 21 to 21n supports or is compliant with an in-band ring tone and thereby capable of transmitting a ring tone registered inside, the registered ring ton is also transmitted to the in-vehicle handsfree apparatus 1.

That is, the cellular phone 21 to 2n supports an in-band ring tone; thus, if a caller telephone number is not received via the cellular phone network 31, a ring tone previously registered in the cellular phone 21 to 21n itself for unspecified telephone numbers is transmitted to the in-vehicle handsfree apparatus 1. In contrast, if the caller telephone number is received via the cellular phone network 31 and the ring tone is previously registered peculiarly for the received caller telephone number, the peculiarly registered ring tone is transmitted to the in-vehicle handsfree apparatus 1.

Figure 3:
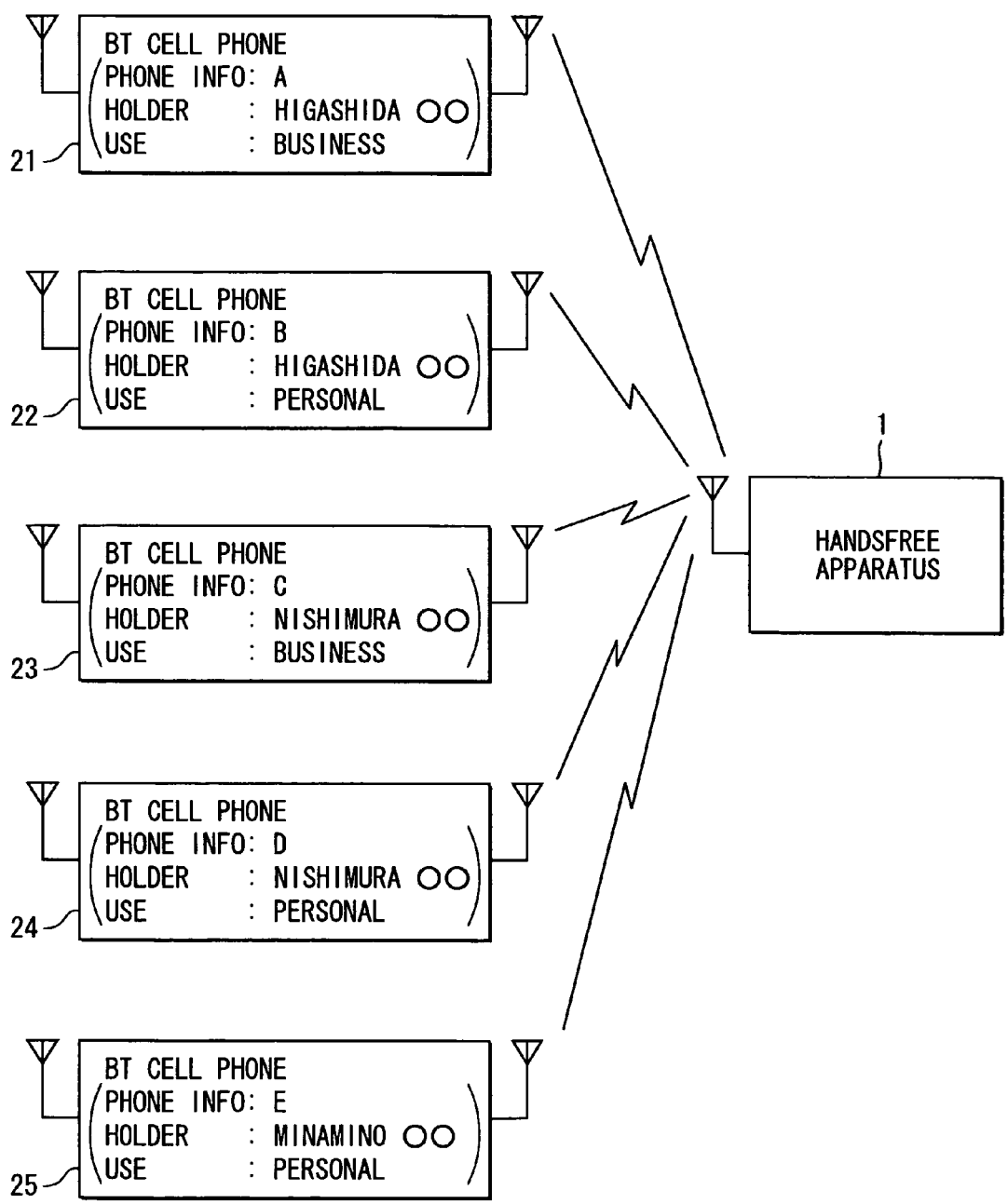
FIG. 3 illustrates a schematic configuration of multiple cellular phones with which a handsfree profile connection is established simultaneously.
Figure 4:
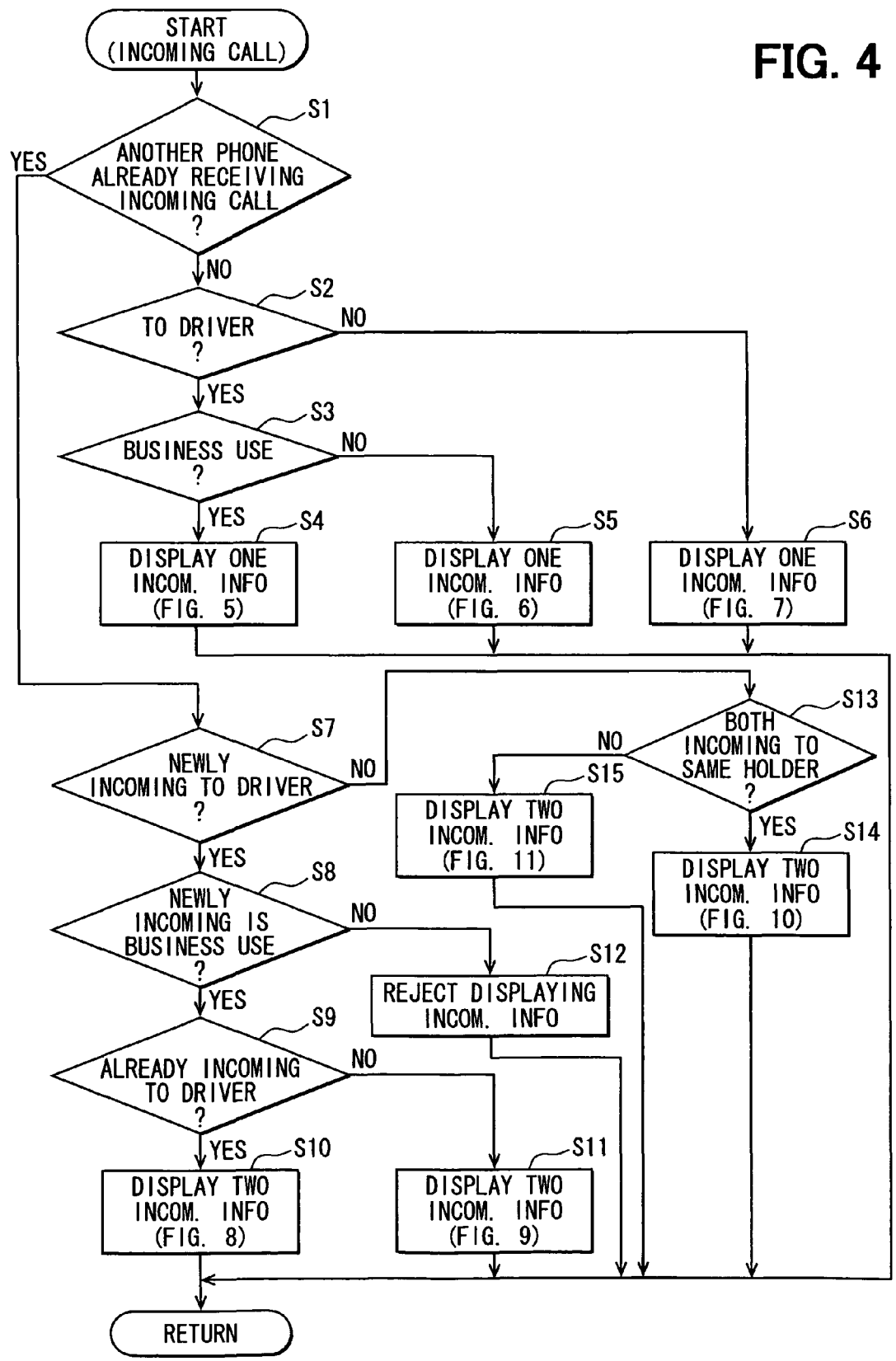
FIG. 4 is a flowchart illustrating an incoming call process.

An operation under the above configuration is explained with reference to FIGS. 3 to 18. As illustrated in FIG. 3, five cellular phones 21 to 25 are brought in the passenger compartment of the vehicle. "Phone information A" is registered in the cellular phone 21. "Phone information B" is registered in the cellular phone 22. "Phone information C" is registered in the cellular phone 23. "Phone information D" is registered in the cellular phone 24. "Phone information E" is registered in the cellular phone 25. Further, as a premise, a handsfree profile connection is established by the in-vehicle handsfree apparatus 1 with the five cellular phones 21 to 25 at the same time. Further, for example, when Mr. Higashida registers himself or his name "Higashida O O" as a driver in the in-vehicle handsfree apparatus 1, it is assumed that the control section 2 automatically recognizes that Mr. Higashida is a driver.

In the in-vehicle handsfree apparatus 1, the control section 2 receives an incoming call notice signal via the BT interface section 3 from any one of the cellular phones 21 to 25. Then, if a starting trigger signal arises, an incoming call process in FIG. 4 starts. As the control section 2 starts the incoming call process, it is determined at S1 whether any cellular phone is receiving an incoming call (i.e., whether any cellular phone is in an incoming call receiving state.)

Herein, it is assumed that before one of the cellular phones 21 to 25 comes to be in an incoming call receiving state, none of the cellular phones 21 to 25 is in an incoming call receiving state. In such a case, when one of the cellular phones 21 to 25 receives an incoming call, the control section 2 determines that there is no cellular phone having been already in an incoming call receiving state (S1: NO). It is then determined at S2 whether the holder of the cellular phone in the incoming call receiving state is a driver. When it is determined that the holder of the cellular phone receiving the incoming call is a driver (S2: YES), it is then determined at S3 whether the intended use of the cellular phone receiving the incoming call is a business use. Based on the result of the determination at S2, S3, the control section 2 displays information relative to the incoming call (referred to as incoming call information) at S4 to S6. Herein, the incoming call information includes the following: (i) a message which indicates "incoming call receiving" or "in an incoming call receiving state"; (ii) a call source telephone number (also referred to as a caller telephone number) of an incoming call, which is informed by the cellular phone receiving the incoming call; (iii) a registration name which is registered in the phonebook data corresponding to the notified caller telephone number; and (iv) a holder and an intended use, which are registered in association with the cellular phone receiving the incoming call.

Figure 5:
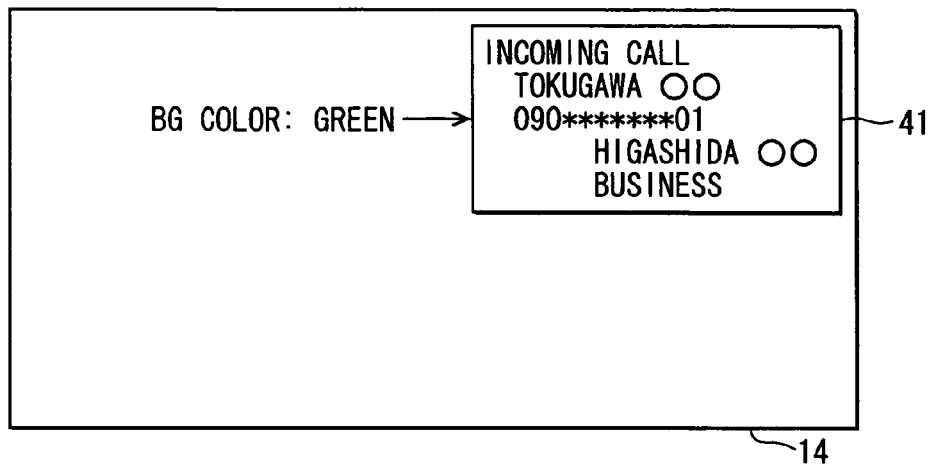
FIGS. 5 to 7 are examples of a display window for an incoming call information item for one cellular phone.
Figure 6:
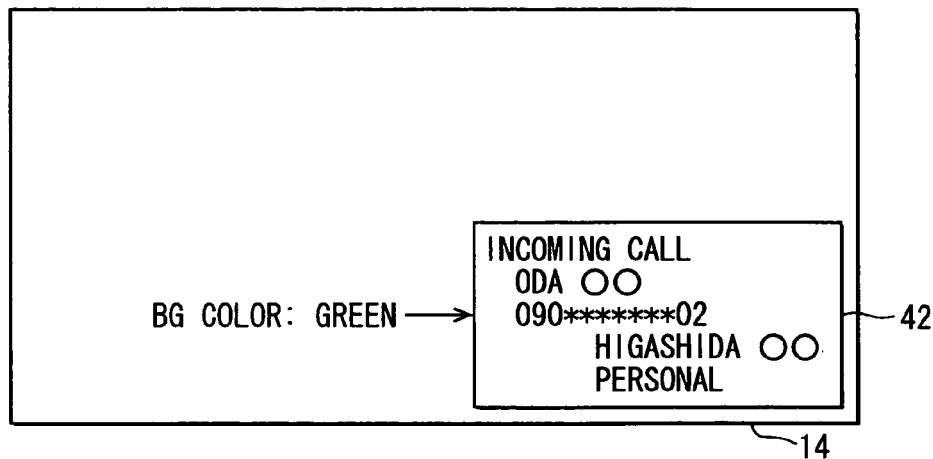
Figure 7:
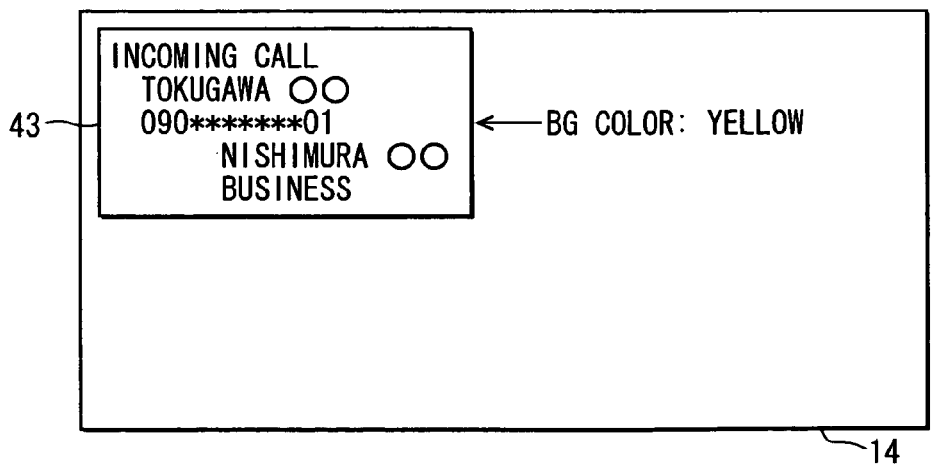
Figure 8:
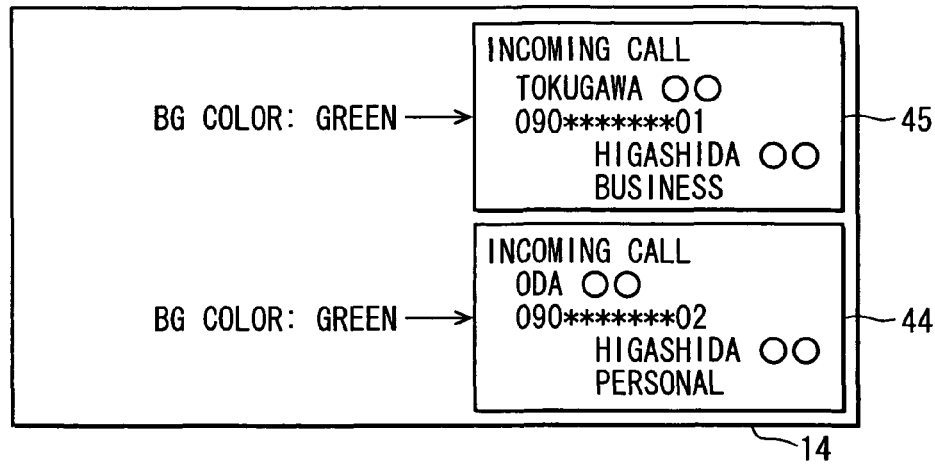
FIGS. 8 to 11 are examples of a display window for two incoming call information items for two cellular phones.
Figure 9:
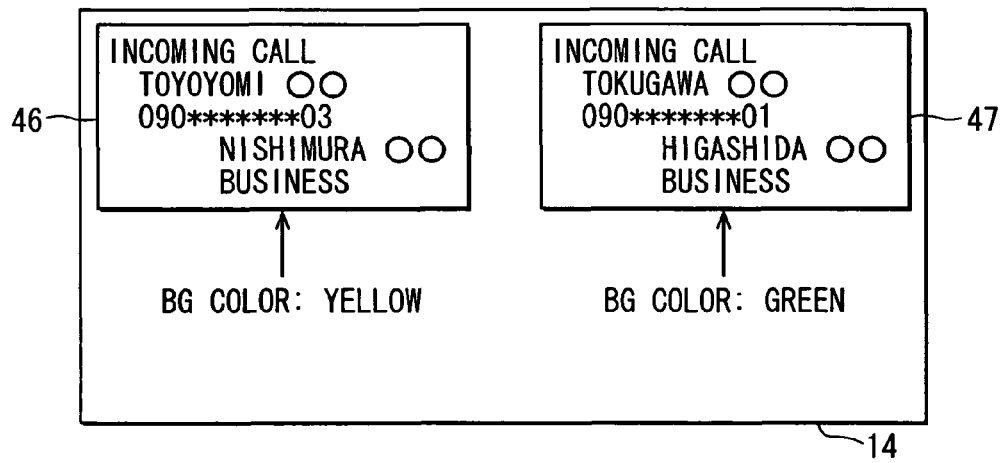

That is, if the cellular phone 21 receives an incoming call, the control section 2 displays an incoming call information item 41 with the background color green in a right upper region of the display screen of the display device 14 at S4 (see FIG. 5). The incoming call information item 41 indicates that the cellular phone 21, which has registration data of "HIGASHIDA OO" as the holder and "BUSINESS" as the intended use, receives an incoming call. If the cellular phone 22 receives an incoming call, the control section 2 displays an incoming call information item 42 with the background color green in a right lower region of the display screen of the display device 14 at S5 (see FIG. 6). The incoming call information item 42 indicates that the cellular phone 22, which has registration data of "HIGASHIDA OO" as the holder and "PERSONAL" as the intended use, receives an incoming call. Further, if the cellular phone 23 receives an incoming call, the control section 2 displays an incoming call information item 43 with the background color yellow in a left upper region of the display screen of the display device 14 at S6 (see FIG. 7). The incoming call information item 43 indicates that the cellular phone 23, which has registration data of "NISHIMURA OO" as the holder and "BUSINESS" as the intended use, receives an incoming call.

In contrast, suppose the case that while one of the cellular phones 21 to 25 has been already receiving an incoming call (i.e., cellular phone is already in an incoming call receiving state), another one receives an incoming call newly (i.e., another cellular phone comes to be in an incoming call receiving state newly). In such a case, the control section 2 determines affirmatively at S1, when one of the cellular phones 21 to 25 receives an incoming call, that there is another cellular phone having been already receiving an incoming call. It is then determined at S7 whether the holder of the cellular phone newly receiving the incoming call is a driver. When it is determined affirmatively at S7 that the holder of the cellular phone newly receiving the incoming call is a driver, it is then determined at S8 whether the intended use of the cellular phone newly receiving the incoming call is a business use. When it is determined affirmatively at S8 that the intended use is a business use, it is then determined at S9 whether the holder of the cellular phone having been already receiving the incoming call is a driver. Based on the result of the determination in the above, the control section 2 displays the incoming call information at S10 to S12.

That is, in case that the cellular phone 22 has been already receiving an incoming call when the cellular phone 21 receives an incoming call newly, the following is performed by the control section 2. That is, in FIG. 8, an incoming call information item 44 is initially displayed with the background color green in a right lower region of the display screen of the display device 14. Herein, the incoming call information item 44 indicates that the cellular phone 22 has registration data of "HIGASHIDA OO" as the holder and "PERSONAL" as the intended use. Then, an interrupting incoming call information item 45 is additionally displayed with the background color green in a right upper region of the display screen of the display device 14. The incoming call information item 45 indicates that the cellular phone 21, which has registration data of "HIGASHIDA OO" as the holder and "BUSINESS" as the intended use, receives an incoming call. The incoming call information item 44 of the cellular phone 22 and the incoming call information item 45 of the cellular phone 21 are thus displayed simultaneously at S10.

Further, in case that when the cellular phone 23 has been already receiving an incoming call, the cellular phone 21 receives an incoming call newly, the following is performed by the control section 2. That is, in FIG. 9, an incoming call information item 46 is initially displayed with the background color yellow in a left upper region of the display screen of the display device 14. The incoming call information item 46 indicates that the cellular phone 23, which has registration data of "NISHIMURA OO" as the holder and "BUSINESS" as the intended use, is receiving an incoming call. Then, an interrupting incoming call information item 47 is additionally displayed with the background color green in a right upper region of the display screen of the display device 14. The incoming call information item 47 indicates that the cellular phone 21, which has registration data of "HIGASHIDA OO" as the holder and "BUSINESS" as the intended use, receives an incoming call. The incoming call information item 46 of the cellular phone 23 and the incoming call information item 47 of the cellular phone 21 are displayed simultaneously at S11.

Further, when it is determined negatively at S8 that the intended use is not a business use, displaying of the incoming call information indicating the reception of the incoming call is rejected at S12. The state of displaying a single incoming call window is continued. The single incoming call window is a display window for indicating that only one cellular phone is receiving an incoming call. That is, when it is determined that (i) the intended use of the cellular phone which initially receives an incoming call is a business use (in this case, defined as a first ordered classification or first prioritized classification) and (ii) the intended use of the cellular phone which newly receives an incoming call is a private use (in this case, defined as a second ordered classification or second prioritized classification), the control section 2 rejects displaying of the incoming call information item relative to the cellular phone for a personal use.

Further, it is determined negatively at S7 that the holder of the cellular phone receiving the incoming call is not a driver, it is then determined at S13 whether the holder of the cellular phone newly receiving the incoming call and the holder of the cellular phone initially receiving the incoming call are identical to each other. Based on the result of the determination in the above, the control section 2 displays the incoming call information item at S14 or S15.

Figure 10:
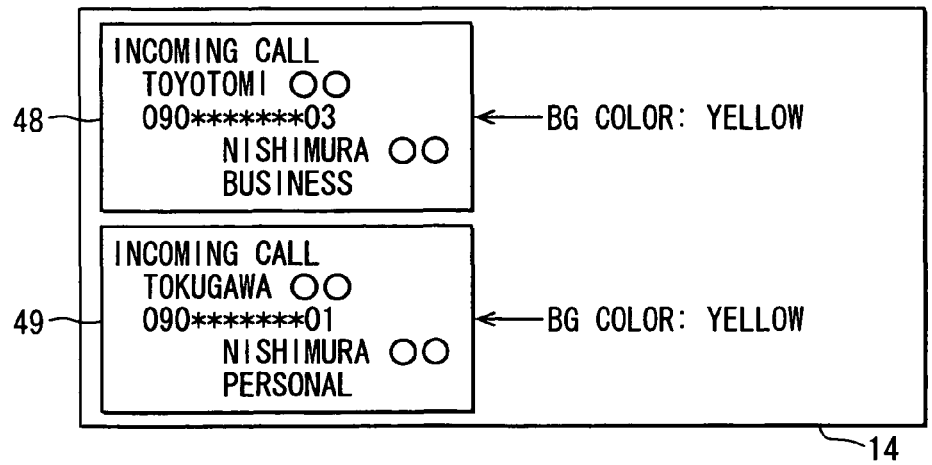
Figure 11:
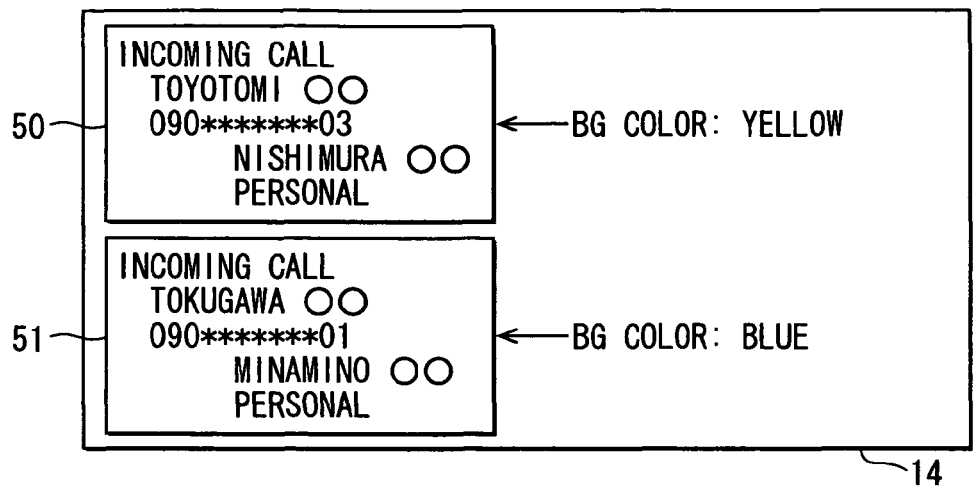
Figure 13:
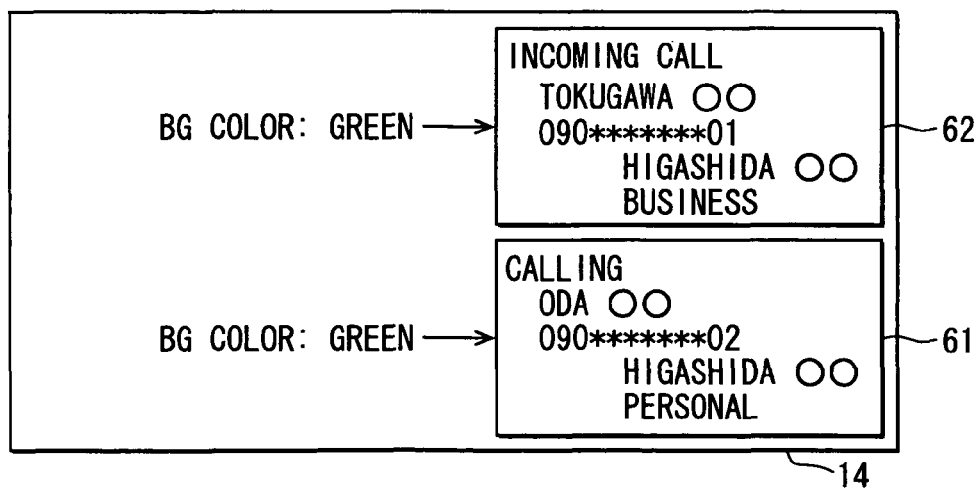
FIGS. 13 to 16 are examples of a display window for an incoming call information item and a calling information item for two cellular phones.
Figure 12:
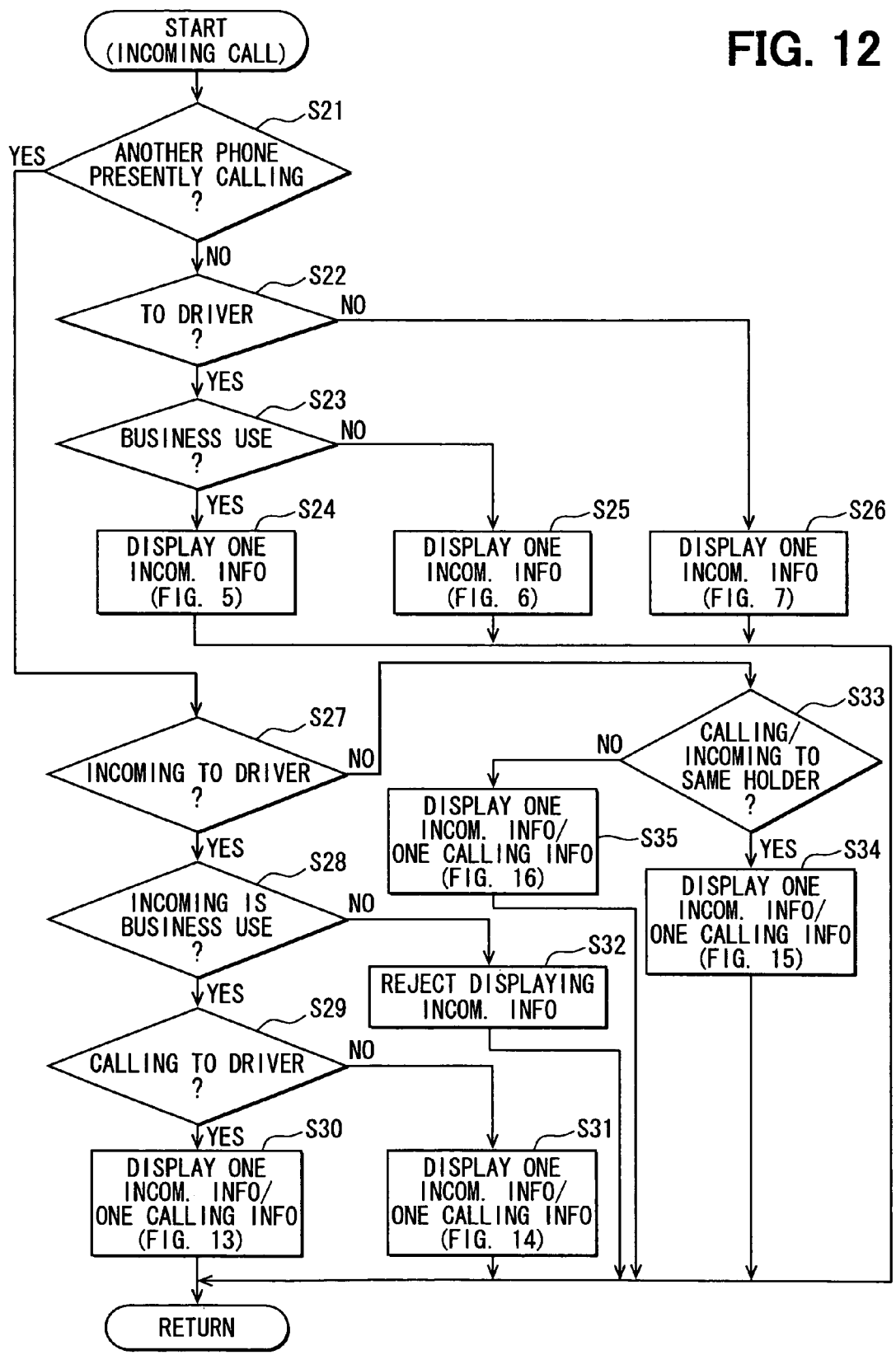
FIG. 12 is a flowchart illustrating another incoming call process.
Figure 14:
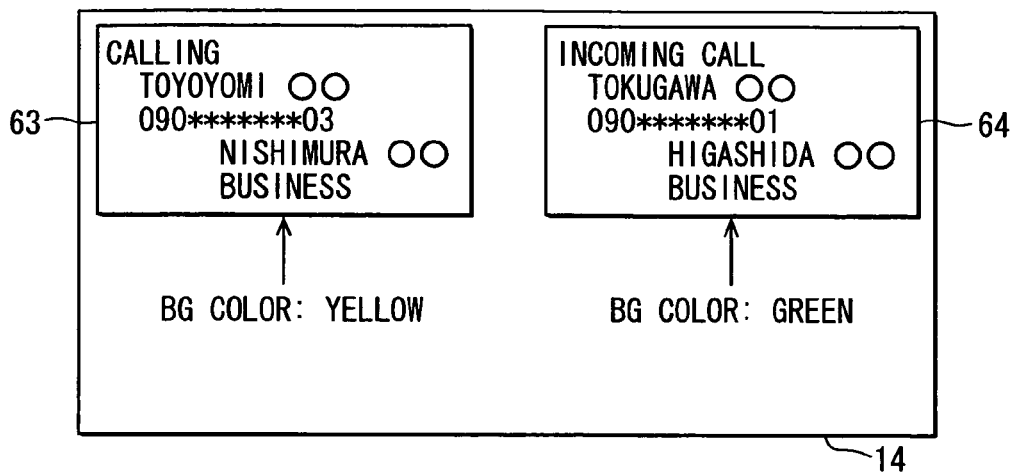
Figure 15:
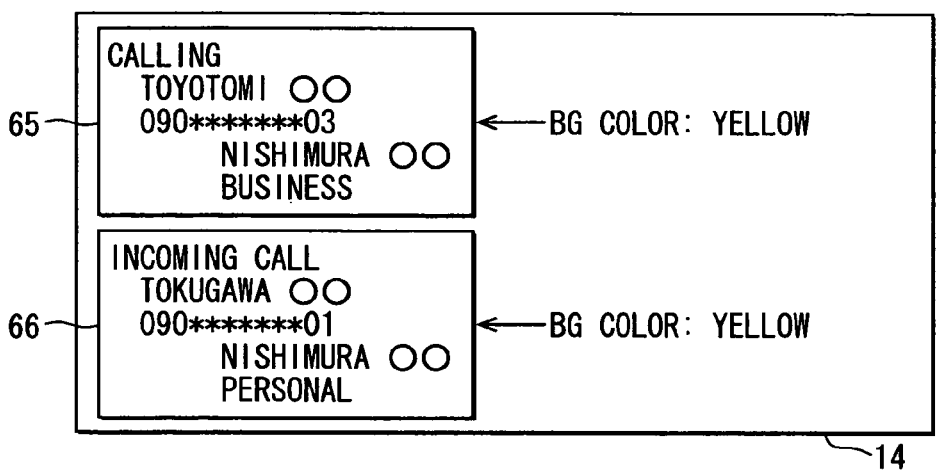
Figure 16:
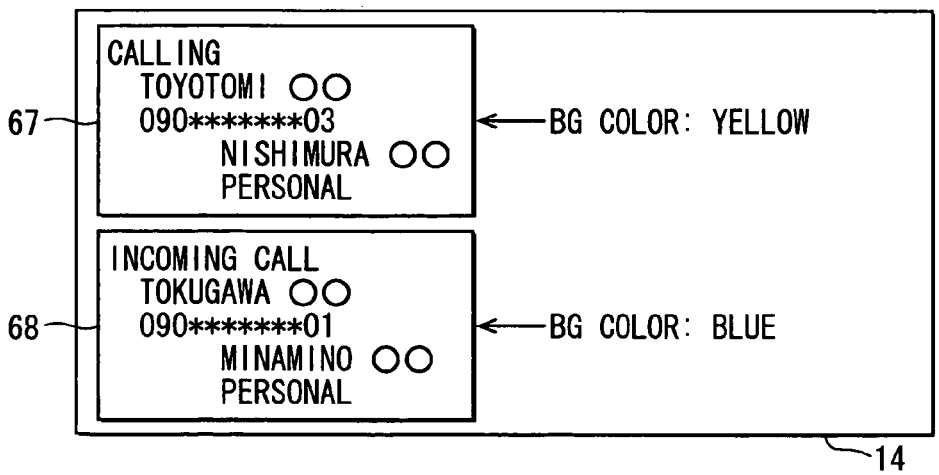
Figure 17:
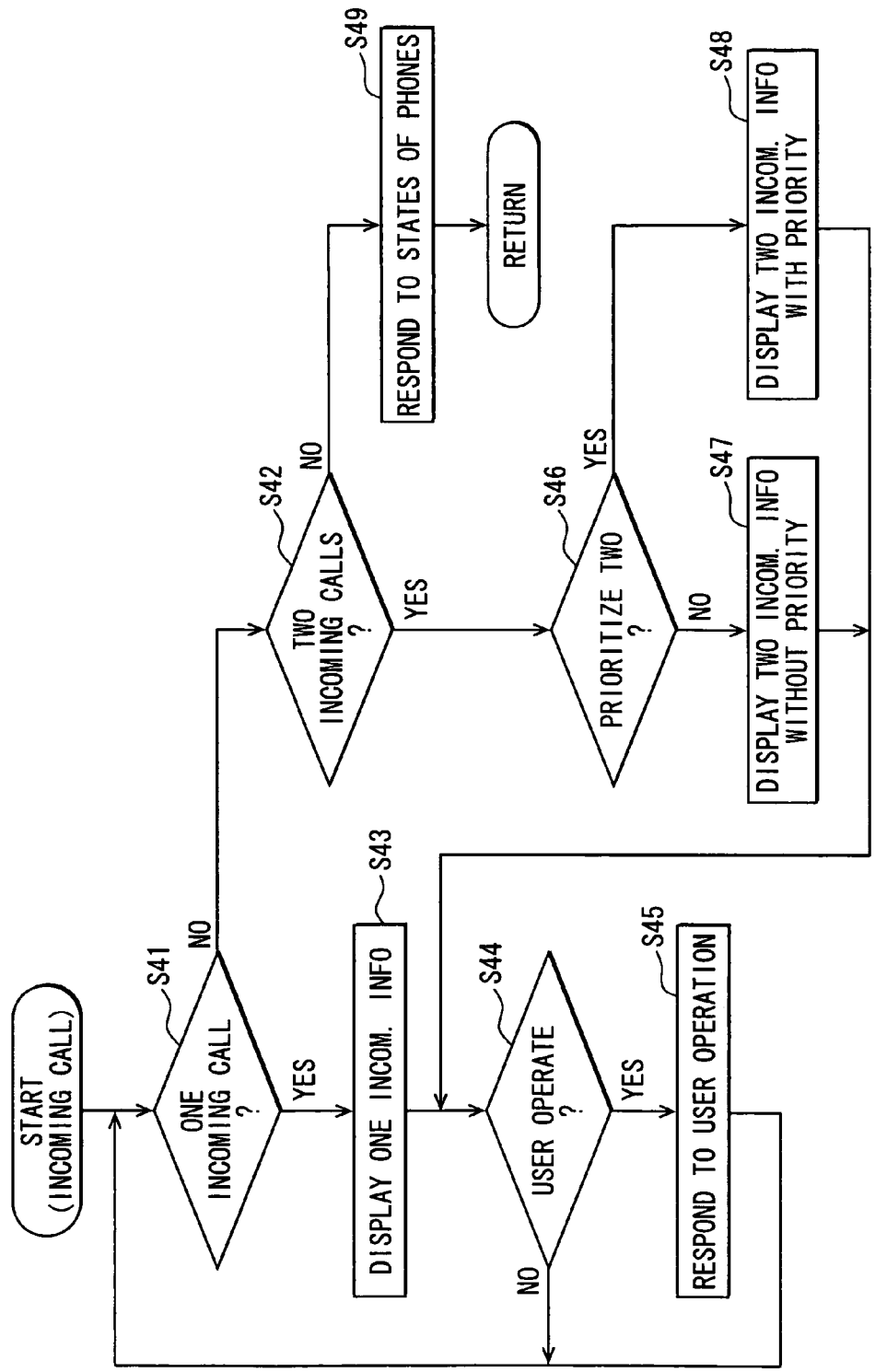
FIG. 17 is a flowchart illustrating yet another incoming call process.

That is, in case that when the cellular phone 23 has been already receiving an incoming call, the cellular phone 24 receives an incoming call newly, the following is performed by the control section 2. In FIG. 10, an incoming call information item 48 is initially displayed with the background color yellow in a left upper region of the display screen of the display device 14. The incoming call information item 48 indicates that the cellular phone 23, which has registration data of "NISHIMURA OO" as the holder and "BUSINESS" as the intended use, is receiving an incoming call. Then, an interrupting incoming call information item 49 is additionally displayed with the background color yellow in a left lower region of the display screen of the display device 14. The incoming call information item 49 indicates that the cellular phone 24, which has registration data of "NISHIMURA OO" as the holder and "PERSONAL" as the intended use, receives an incoming call. The incoming call information item 48 of the cellular phone 23 and the incoming call information item 49 of the cellular phone 24 are displayed simultaneously at S14.

Further, in case that when the cellular phone 24 has been already receiving an incoming call, the cellular phone 25 receives an incoming call newly, the following is performed by the control section 2. That is, in FIG. 11, an incoming call information item 50 is initially displayed with the background color yellow in a left upper region of the display screen of the display device 14. Herein, the incoming call information item 50 indicates that the cellular phone 24, which has registration data of "NISHIMUARA OO" as the holder and "PERSONAL" as the intended use, is receiving an incoming call. Then, an interrupting incoming call information item 51 is additionally displayed with the background color blue in a left lower region of the display screen of the display device 14. The incoming call information item 51 indicates that the cellular phone 25, which has registration data of "MINAMINO OO" as the holder and "PERSONAL" as the intended use, receives an incoming call. The incoming call information item 50 of the cellular phone 24 and the incoming call information item 51 of the cellular phone 25 are displayed simultaneously at S15.

In the above, the incoming call information items are displayed by changing or differentiating the background colors and the display positions based on the holders of the cellular phones receiving incoming calls. Without being limited to the above, the incoming call information item can be displayed by changing a lighting pattern or blinking pattern based on the holder of a cellular phone receiving an incoming call. Furthermore, the incoming call information item can be displayed by changing the background color and display position based on the intended use of the cellular phone receiving an incoming call. In addition, when multiple incoming call information items are displayed, an incoming call information item of the cellular phone which receives an incoming call first may be displayed in a lighting manner while an incoming call information item of the cellular phone which receives an incoming call second may be displayed in a blinking manner. Thus, the order of receiving incoming calls can be recognized by a user. Furthermore, of the incoming call information item, the holder and the intended use may be differentiated from other parts in respect of the background color. The holder and intended use can be thus displayed in the highlighted manner.

In the above embodiment, an incoming call information item of the cellular phone possessed by a driver is displayed in the display device 14 to be closer to the driver or driver seat. For instance, the display screen is divided into two screen portions of a driver side screen portion close to the driver seat and a front passenger side screen portion close to the front passenger seat. Thus, the incoming call information item of the cellular phone possessed by the driver is displayed in the driver side screen portion being closer to the driver seat than the front passenger side screen portion. Further, if the relevant vehicle mounted with the in-vehicle handsfree apparatus 1 has a right-hand steering wheel, like the description of the present embodiment, the incoming call information item may be desirably displayed in the right half screen portion of the display screen in the sight line from the front side of the display screen. Herein, the right half screen portion is closer to the driver seat than the left half screen portion. In contrast, if the relevant vehicle has a left-hand steering wheel, the incoming call information item may be desirably displayed in the left half screen portion of the display screen in the sight line from the front side of the display screen. Herein, the left half screen portion is closer to the driver seat than the right half screen portion.

The above explains the case that while one of the cellular phones 21 to 25 has been already receiving an incoming call another one receives an incoming call newly. In contrast, the following explains the case that when one of the cellular phones 21 to 25 has been already calling (i.e., in a calling state), another one receives an incoming call newly, with reference to FIGS. 12 to 16. In this case, when one of the cellular phones 21 to 25 receives an incoming call and the control section 2 determines that there is no cellular phone presently calling (S21: NO), S22 to S26 equivalent to S2 to S6 in FIG. 4 take place. In contrast, when one of the cellular phones 21 to 25 receives an incoming call and the control section 2 determines affirmatively that there is a cellular phone presently calling (S21: YES), S27 to S35 equivalent to S7 to S15 in FIG. 4 take place. In this case, in FIGS. 13 to 16, a calling information item 61, 63, 65, 67 relative to a cellular phone presently calling (i.e., in a calling state) is initially displayed. An interrupting incoming call information item relative to a cellular phone receiving an incoming call is additionally displayed in the display screen. The incoming call information item and the calling information item are thus displayed simultaneously.

In addition, when the intended uses are stored as attributes of the cellular phones 21 to 2n as illustrated in FIG. 2, the intended uses can be collated (i.e., compared) with times and dates of receiving incoming calls. This enables setting of priority order to two cellular phones receiving incoming calls simultaneously. The following explains the case where the control section 2 sets the priority or priority order in displaying with reference to FIGS. 17, 18A, 18B.

As starting an incoming call process, the control section 2 determines whether the number of cellular phones which are in incoming call receiving states is one or two at S41, S42. When it is determined affirmatively at S41 that the number of cellular phones which are in the incoming call receiving states is one, a single incoming call display window for one cellular phone receiving an incoming call is displayed in the display device 14 at S43. In this case, if the control section 2 receives the caller telephone number from the cellular phone which is receiving the incoming call, the received caller telephone number is displayed. If the registration name corresponding to the caller telephone number is stored in the phonebook data, the stored registration name is also displayed.

The control section 2 then determines whether the user's operation is performed on the single incoming call display window for one cellular phone receiving an incoming call in the display screen at S44. When it is determined affirmatively at S44 that the user's operation is performed, a process to respond to the user's operation is executed at S45. That is, the control section 2 generates the following switches in the display screen of the display device 14: a switch for answering or responding to an incoming call; a switch for rejecting an incoming call; a switch for increasing a sound volume of a ring tone corresponding to an incoming call; and a switch for decreasing a sound volume of the ring tone. When the switch for responding to an incoming call is operated, the control section 2 transmits an incoming call answer signal to the relevant cellular phone via the BT interface section 3. When the switch for rejecting an incoming call is operated, the control section 2 transmits an incoming call rejection signal to the relevant cellular phone via the BT interface section 3. When the switch for increasing a sound volume is operated, the control section 2 increases the sound volume of a ring tone of the incoming call. When the switch for decreasing a sound volume is operated, the control section 2 decreases the sound volume of the ring tone of the incoming call.

Further, when it is determined affirmatively at S42 that the number of cellular phones in incoming call receiving states is two, It is determined whether the intended uses of the two cellular phones are identical to each other to thereby determine at S46 whether the priority can be set with respect to the two cellular phones in incoming call receiving states at the same time. Namely, when the control section 2 determines that the two cellular phones have an identical intended use, it is determined negatively at S46 that the priority cannot be set with respect to the two cellular phones in incoming call receiving states at the same time. The control section 2 displays, at S47, a display window for two cellular phones simultaneously in incoming call receiving states without setting any priority.

Figure 18A:
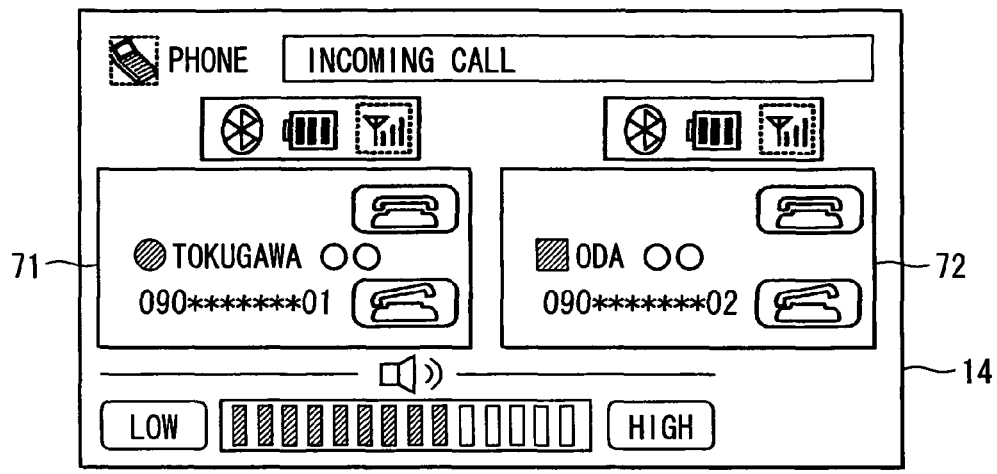
FIGS. 18A, 18B are examples of a display window for two incoming call information items for two cellular phones.

FIG. 18A illustrates an example of a display window in the display screen of the display device 14. In this example, two relevant cellular phones in incoming call receiving states have an identical intended use. From one of the cellular phones, "090****01" is received as a caller telephone number; "TOKUGAWA OO" is stored in the phonebook data as a registration name corresponding to the received caller telephone number; and "090**01" as a caller telephone number and "TOKUGAWA OO" as a registration name are displayed in a left half screen portion in the display screen of the display device 14. Further, simultaneously, "090**02" is received as a caller telephone number is received from the other cellular phone; "ODA OO" is stored in the phonebook data as a registration name corresponding to the received caller telephone number; and "090****02" as a caller telephone number and "ODA OO" as a registration name are displayed in a right half screen portion in the display screen of the display device 14.

In contrast, when two relevant cellular phones in incoming call receiving states have intended uses different from each other, it is determined affirmatively at S46 that the priority can be set with respect to the two cellular phones in incoming call receiving states at the same time and it is determined whether the present time is in a business day or a non-business day. It is assumed that the intended uses of the two cellular phones in incoming call receiving states at the same time are the business use and the personal use. In such a case, when it is a business day, the priority is given to the cellular phone for the business use; when it is a non-business day, the priority is given to the cellular phone for the personal use. The control section 2 displays a display window for two cellular phones simultaneously in incoming call receiving states with the priority being set at S48.

Figure 18B:
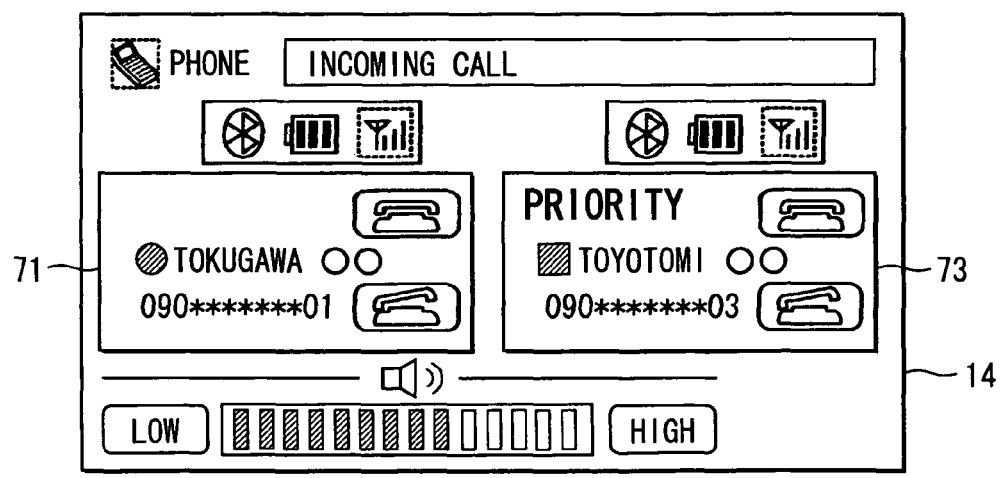

FIG. 18B illustrates another example of a display window in the display screen of the display device 14. In this example, two relevant cellular phones in incoming call receiving states have mutually different intended uses. From one of the two cellular phones in incoming call receiving states, "090****01" is received as a caller telephone number; "TOKUGAWA OO" is stored in the phonebook data as a registration name corresponding to the received caller telephone number; and "090**01" as a caller telephone number and "TOKUGAWA OO" as a registration name are displayed in a left half screen portion in the display screen of the display device 14. Further, simultaneously, "090**03" is received as a caller telephone number from the other cellular phone; "TOYOTOMI OO" is stored in the phonebook data as a registration name corresponding to the received caller telephone number; and "090****03" as a caller telephone number and "TOYOTOMI OO" as a registration name are displayed in a right half screen portion in the display screen of the display device 14.

Herein, the control section 2 determine whether the following conditions are satisfied at the same time: (i) the cellular phone assigned with a telephone number "090****01" is for the business use; (ii) the cellular phone assigned with a telephone number "090****03" is for the personal use; and (iii) the present day is a non-business day. When the above conditions are determined to be satisfied at the same time, the control section 2 gives priority to the cellular phone for the personal use, and displays information indicating that the cellular phone for the personal use is given the priority. For instance, such information is exemplified by character information "PRIORITY" included in the incoming call information item 73 in FIG. 18B.

Further, even in the display window for two cellular phones in incoming call receiving states, like in the single incoming call display window for one cellular phone in an incoming call receiving state, the control section 2 determines whether the user's operation is performed on the display window for two cellular phones receiving incoming calls in the display screen at S44. When it is determined affirmatively at S44 that the user's operation is performed, a process to respond to the user's operation is executed at S45. When the incoming calls reaching the two cellular phones end, a process is executed at S49 to respond to the individual states of the cellular phones having ended receiving of the incoming calls. The processing is then returned.

In addition, the display of the character information "PRIORITY" is used as a method for giving notice of giving a priority in the above. Alternatively, the background color or character color may be differentiated to give notice of giving a priority. Further, the lighting pattern or blinking pattern may be used for differentiating or highlighting the prioritized portion. For instance, the lower-priority one is lighted on or turned on while the higher-priority one is blinked. Further, the display position in the display screen can be also used for differentiating or highlighting the prioritized portion. For example, the prioritized portion or prioritized information can be located, within the display screen, at a half screen portion closer to a driver than the other half screen portion.

In addition, in the above, the intended use of the cellular phone registered previously is used to determine the setting of the priority. Another one may be used. For example, each time the BT interface section 3 establishes a handsfree profile connection with individual cellular phones, a corresponding clock time of establishing the connection may be stored and updated in the storage section 5. It may be designed such that a priority may be given to a cellular phone corresponding to the earliest clock time of establishing the connection.

Further, each time the BT interface section 3 establishes a handsfree profile connection with individual cellular phones, the number of times of establishing the connection may be stored and updated in the storage section 5. It may be thus designed such that a priority is given to a cellular phone corresponding to the greatest number of times of establishing the connection.

As explained above, the in-vehicle handsfree apparatus 1 according to the embodiment operates as follows. A handsfree profile connection is established with multiple cellular phones 21 to 2n simultaneously. When it is determined that incoming calls simultaneously reach two or more cellular phones 21 to 2n or when it is determined that at least one cellular phone is calling and another receives an incoming call, based on the attributes (for example, the holder or owner, the intended use, etc.) of the relevant cellular phones, the notice manners (e.g., background color) for giving notice of an incoming call information item or a calling information item can be differentiated from each other. Thus, the user can appropriately recognize the individual states of the cellular phones 21 to 2n. The user's usability can be thus enhanced.

The present invention is not limited only to the above-mentioned embodiment, and can be modified or extended as follows. The function of the in-vehicle handsfree apparatus 1 may be included in another in-vehicle apparatus, such as an in-vehicle navigation apparatus.

Differentiating the notice manner of indicating an incoming call information item or a calling information item is not only by using the display manner but also by using sound output manner. In such a case, the user can aurally recognize the individual states of the cellular phones 21 to 2n appropriately. This can eliminate a need of user's sight line movement. Further, a vibrator may be prepared to achieve an oscillating manner for differentiating the notice manner. In this case, a user touches a vibrator to thereby tactually recognize each state of the multiple cellular phones 21 to 2n. In addition, another notice manner may be, of course, used for the above purpose in addition to the display manner, sound output manner, and oscillating manner.

The layouts or display positions for giving notice of an incoming call information item or a calling information item may be differentiated from the above explanation. The attribute of the cellular phone may be a class other than the holder or the intended use. When the caller telephone number is not received from the cellular phones 21 to 2n, a display message "CALLER ID BLOCK" indicating that a caller telephone number is not received from the source telephone may be displayed.

In the above, when a caller telephone number is received from the cellular phones 21 to 2n, the phonebook data, which the user previously registered to the in-vehicle handsfree apparatus 1, is searched for a registration name corresponding to the received caller telephone number. Thus, the registration name can be displayed in the display device 14. Without being limited to the above, another procedure can be adopted. For instance, the in-vehicle handsfree apparatus 1 establishes a phone book access profile with the cellular phone 21 to 2n. The phonebook data, which the user previously registered to the cellular phone 21 to 2n, is received and stored in the handsfree apparatus 1. The stored phonebook data is thereafter searched. That is, the searched target is the phonebook data originally registered in the cellular phone 21 to 2n. Eventually, the retrieved registration name corresponding to the caller telephone number is displayed in the display device 14.

The display apparatus 13 may function as a display means or section. Although the above explains that the display apparatus 13 includes a single display device 14, multiple display devices may be included in the display means. For instance, a handsfree profile connection is established with multiple cellular phones at the same time so that multiple information items including an incoming call information item and a calling information item, if present, need to be displayed. In such a case, those multiple information items may be divided and distributed to the multiple display devices to thereby display them separately. For instance, an incoming call or calling information item relative to a cellular phone the holder of which is a driver may be desirably distributed to a display device arranged near the driver seat; in contrast, an incoming call or calling information item relative to a cellular phone the holder of which is a fellow passenger other than the driver may be desirably distributed to a display device arranged near the front passenger seat.

Each or any combination of processes, steps, or means explained in the above can be achieved as a software portion or unit (e.g., subroutine) and/or a hardware portion or unit (e.g., circuit or integrated circuit), including or not including a function of a related device; furthermore, the hardware portion or unit can be constructed inside of a microcomputer.

Furthermore, the software portion or unit or any combinations of multiple software portions or units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. An in-vehicle handsfree apparatus comprising:
a handsfree connection section configured to establish a handsfree communication protocol connection with a plurality of cellular phones simultaneously;
a storage section configured to store attributes of the cellular phones with which the handsfree communication protocol connection is established simultaneously; and
a control section configured to determine whether an incoming call is being received by a cellular phone included in the cellular phones with which the handsfree communication protocol connection is established simultaneously;
the control section being further configured to,
when it is determined that, of the cellular phones with which the handsfree communication protocol connection is established simultaneously, at least two cellular phones are receiving individual incoming calls,
cause a notice section to give notice of incoming call information relative to the at least two cellular phones in individual notice manners, the individual notice manners being differentiated from each other based on individual attributes stored in the storage section with respect to the at least two cellular phones,
cause the notice section not to give notice of the incoming call information relative to the second cellular phone,
when, of the at least two cellular phones receiving the incoming calls, a first cellular phone has an attribute of a first ordered classification and an other cellular phone has an attribute of a second ordered classification.

2. The in-vehicle handsfree apparatus according to claim 1, further comprising:
a clock portion configured to clock times and dates,
the storage section being further configured to store intended uses as the attributes of the cellular phones,
the control section being further configured to,
when it is determined that, of the cellular phones with which the handsfree communication protocol connection is established simultaneously, the at least two cellular phones are receiving individual incoming calls,
cause the notice section to give notice of (i) the incoming call information relative to the at least two cellular phones in the individual notice manners, the individual notice manners being differentiated from each other based on comparison between, with respect to the at least two cellular phones, (i) times and dates clocked by the clock portion and (ii) the intended uses stored in the storage section.

3. The in-vehicle handsfree apparatus according to claim 1, further comprising:
a connection clock time detection portion configured to detect a connection clock time when the handsfree connection section establishes a handsfree communication protocol connection with a cellular phone,
the storage section being further configured to store, as the attribute of the cellular phone, the connection clock time detected by the connection clock time detection portion,
the control section being further configured to,
when it is determined that, of the cellular phones with which the handsfree communication protocol connection is established simultaneously, the at least two cellular phones are receiving individual incoming calls,
cause the notice section to give notice of the incoming call information relative to the at least two cellular phones in the individual notice manners, the individual notice manners being differentiated from each other based on connection clock times stored in the storage section with respect to the at least two cellular phones.

4. The in-vehicle handsfree apparatus according to claim 1,
a connection times detection portion configured to count a number of times relative to the handsfree communication protocol connection with respect to a cellular phone established by the handsfree connection section,
the storage section being further configured to store, as the attribute of the cellular phone, the number of times, relative to the handsfree communication protocol connection, counted by the connection times detection portion,
the control section being further configured to,
when it is determined that, of the cellular phones with which the handsfree communication protocol connection is established simultaneously, the at least two cellular phones are receiving individual incoming calls,
cause the notice section to give notice of the incoming call information relative to the at least two cellular phones in the individual notice manners, the individual notice manners being differentiated from each other based on the number of times relative to the handsfree communication protocol connection stored in the storage section with respect to the at least two cellular phones.

5. The in-vehicle handsfree apparatus according to claim 1,
the notice section being further configured to include a display device,
the control section being further configured to cause the display device to display the notice of the incoming call information relative to the at least two cellular phones in individual display manners being differentiated from each other to thereby differentiate the individual notice manners from each other.

6. The in-vehicle handsfree apparatus according to claim 5,
the control section being further configured to cause the display device to display the notice of the incoming call information relative to the at least two cellular phones in the individual display manners being differentiated from each other in background colors or character colors.

7. The in-vehicle handsfree apparatus according to claim 5,
the control section being further configured to cause the display device to display the notice of the incoming call information relative to the at least two cellular phones in the individual display manners being differentiated from each other in display positions.

8. The in-vehicle handsfree apparatus according to claim 5,
the control section being further configured to cause the display device to display the notice of the incoming call information relative to the at least two cellular phones in the individual display manners being differentiated from each other in lighting patterns or blinking patterns.

9. An in-vehicle handsfree apparatus comprising:
a handsfree connection section configured to establish a handsfree communication protocol connection with a plurality of cellular phones simultaneously;
a storage section configured to store attributes of the cellular phones with which the handsfree communication protocol connection is established simultaneously; and
a control section configured to determine whether a cellular phone included in the cellular phones with which the handsfree communication protocol connection is established simultaneously is in a calling state or in an incoming call receiving state,
the control section being further configured to,
when it is determined that, of the cellular phones with which the handsfree communication protocol connection is established simultaneously, one cellular phone is in an incoming call receiving state and an other cellular phone is in a calling state,
cause a notice section to give notice of (i) calling information relative to the one cellular phone and (ii) incoming call information relative to the other cellular phone, in respective notice manners relative to the one cellular phone and the other cellular phone, the respective notice manners being differentiated from each other based on an attribute of the one cellular phone and an attribute of the other cellular phone, the attributes being stored in the storage section with respect to the one cellular phone and the other cellular phone,
cause the notice section not to give notice of the incoming call information relative to the other cellular phone,
when the one cellular phone has an attribute of a first ordered classification and the other cellular phone has an attribute of a second ordered classification.

10. The in-vehicle handsfree apparatus according to claim 9,
the notice section being further configured to include a display device,
the control section being further configured to
cause the display device to display the notice of the calling information and the incoming call information in the respective display manners being differentiated from each other to thereby differentiate the respective notice manners from each other.

11. The in-vehicle handsfree apparatus according to claim 10,
the control section being further configured to cause the display device to display the notice of the calling information and the incoming call information in the respective display manners being differentiated from each other in background colors or character colors.

12. The in-vehicle handsfree apparatus according to claim 10,
the control section being further configured to cause the display device to display the notice of the calling information and the incoming call information in the respective display manners being differentiated from each other in display positions.

13. The in-vehicle handsfree apparatus according to claim 10,
the control section being further configured to cause the display device to display the notice of the calling information and the incoming call information in the respective display manners being differentiated from each other in lighting patterns or blinking patterns.

14. A method for an in-vehicle handsfree apparatus for a vehicle to give notice of states of a plurality of cellular phones with which a handsfree communication protocol connection is established simultaneously, the method comprising:
storing attributes of the cellular phones with which the handsfree communication protocol connection is established simultaneously;
determining that, of the cellular phones with which the handsfree communication protocol connection is established simultaneously, at least two cellular phones are receiving individual incoming calls;
causing a notice section to give notice of incoming call information relative to the at least two cellular phones in individual notice manners, the individual notice manners being differentiated from each other based on individual attributes stored in the storage section with respect to the at least two cellular phones, and causing the notice section not to give notice of the incoming call information relative to the second cellular phone, when, of the at least two cellular phones receiving the incoming calls, a first cellular phone has an attribute of a first ordered classification and an other cellular phone has an attribute of a second ordered classification.

15. A method for an in-vehicle handsfree apparatus for a vehicle to give notice of states of a plurality of cellular phones with which a handsfree communication protocol connection is established simultaneously, the method comprising:

storing attributes of the cellular phones with which the handsfree communication protocol connection is established simultaneously;

determining that, of the cellular phones with which the handsfree communication protocol connection is established simultaneously, one cellular phone is in an incoming call receiving state and an other cellular phone is in a calling state; and causing a notice section to give notice of (i) calling information relative to the one cellular phone and (ii) incoming call information relative to the other cellular phone, in respective notice manners relative to the one cellular phone and the other cellular phone, the respective notice manners being differentiated from each other based on an attribute of the one cellular phone and an attribute of the other cellular phone, the attributes being stored in the storage section with respect to the one cellular phone and the other cellular phone, and causing the notice section not to give notice of the incoming call information relative to the other cellular phone, when the one cellular phone has an attribute of a first ordered classification and the other cellular phone has an attribute of a second ordered classification.

16. The in-vehicle handsfree apparatus according to claim 1, wherein:
the stored attribute of the cellular phone indicates a holder of the each of the cellular phones;
when the holder of the cellular phones is determined to be a driver of the vehicle, the attribute of the cellular phone is defined as the first ordered classification;
when the holder of the cellular phone is determined to be other than the driver of the vehicle, the attribute of the cellular phone is defined as the second ordered classification.

17. The in-vehicle handsfree apparatus according to claim 9, wherein:
the stored attribute of the cellular phone indicates a holder of the each of the cellular phones;
when the holder of the cellular phones is determined to be a driver of the vehicle, the attribute of the cellular phone is defined as the first ordered classification;
when the holder of the cellular phone is determined to be other than the driver of the vehicle, the attribute of the cellular phone is defined as the second ordered classification.

18. The method according to claim 14, wherein:
the stored attribute of the cellular phone indicates a holder of the each of the cellular phones;
when the holder of the cellular phones is determined to be a driver of the vehicle, the attribute of the cellular phone is defined as the first ordered classification;
when the holder of the cellular phone is determined to be other than the driver of the vehicle, the attribute of the cellular phone is defined as the second ordered classification.

19. The method according to claim 15, wherein:
the stored attribute of the cellular phone indicates a holder of the each of the cellular phones;
when the holder of the cellular phones is determined to be a driver of the vehicle, the attribute of the cellular phone is defined as the first ordered classification;
when the holder of the cellular phone is determined to be other than the driver of the vehicle, the attribute of the cellular phone is defined as the second ordered classification.

20. The in-vehicle handsfree apparatus according to claim 1, wherein:
the stored attribute of the cellular phone indicates an intended use of the cellular phones;
when the intended use of the cellular phones is determined to be a business use, the attribute of the cellular phone is defined as the first ordered classification;
when the intended use of the cellular phone is determined to be a personal user, the attribute of the cellular phone is defined as the second ordered classification.

21. The in-vehicle handsfree apparatus according to claim 9, wherein:
the stored attribute of the cellular phone indicates an intended use of the cellular phones;
when the intended use of the cellular phones is determined to be a business use, the attribute of the cellular phone is defined as the first ordered classification;
when the intended use of the cellular phone is determined to be a personal user, the attribute of the cellular phone is defined as the second ordered classification.

22. The method according to claim 14, wherein:
the stored attribute of the cellular phone indicates an intended use of the cellular phones;
when the intended use of the cellular phones is determined to be a business use, the attribute of the cellular phone is defined as the first ordered classification;
when the intended use of the cellular phone is determined to be a personal user, the attribute of the cellular phone is defined as the second ordered classification.

23. The method according to claim 15, wherein:
the stored attribute of the cellular phone indicates an intended use of the cellular phones;
when the intended use of the cellular phones is determined to be a business use, the attribute of the cellular phone is defined as the first ordered classification;
when the intended use of the cellular phone is determined to be a personal user, the attribute of the cellular phone is defined as the second ordered classification.

* * * * *